(12) United States Patent
Kraemer et al.

(10) Patent No.: US 12,253,403 B2
(45) Date of Patent: Mar. 18, 2025

(54) SELF-SUFFICIENT DISPLAY FOR FILL LEVEL AND LIMIT LEVEL MEASURING DEVICES

(71) Applicant: VEGA GRIESHABER KG, Wolfach (DE)

(72) Inventors: Florian Kraemer, Muehlenbach (DE); Patrick Heizmann, Oberwolfach (DE); Stefan Allgaier, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 0 days.

(21) Appl. No.: 17/995,326

(22) PCT Filed: Apr. 17, 2020

(86) PCT No.: PCT/EP2020/060908
§ 371 (c)(1),
(2) Date: Oct. 3, 2022

(87) PCT Pub. No.: WO2021/209157
PCT Pub. Date: Oct. 21, 2021

(65) Prior Publication Data
US 2023/0160738 A1  May 25, 2023

(51) Int. Cl.
*G01F 23/80* (2022.01)
*H04Q 9/00* (2006.01)

(52) U.S. Cl.
CPC .......... *G01F 23/804* (2022.01); *H04Q 9/00* (2013.01); *H04Q 2209/84* (2013.01)

(58) Field of Classification Search
CPC ..... G01F 23/804; H04Q 9/00; H04Q 2209/84
See application file for complete search history.

(56) References Cited

U.S. PATENT DOCUMENTS

2007/0020998 A1* 1/2007 Edvardsson .......... G01F 23/284
439/607.01
2007/0084283 A1  4/2007 Carlson et al.
(Continued)

FOREIGN PATENT DOCUMENTS

AU    2008100552 A4   10/2008
DE    196 41 339 A1    4/1998
(Continued)

OTHER PUBLICATIONS

International Preliminary Report on Patentability and Written Opinion issued Oct. 27, 2022 in PCT/EP2020/060908, 9 pages.
(Continued)

*Primary Examiner* — Amine Benlagsir
(74) *Attorney, Agent, or Firm* — Oblon, McClelland, Maier & Neustadt, L.L.P.

(57) ABSTRACT

A sensor arrangement is provided for level measurement or point level measurement of a product or pressure measurement in a container, the sensor arrangement including: a sensor configure to transmit and receive a measurement signal and to calculate measurement data; and a display device, which is provided separately from the sensor, configured to be mounted on or in the container, and includes a receiver configured to wirelessly receive the measurement data of the sensor, and a signal indicator configured to display the measurement data of the sensor. A method is also provided for fill level measurement or limit level measurement of a filling material or pressure measurement in a container.

15 Claims, 4 Drawing Sheets

(56) References Cited

U.S. PATENT DOCUMENTS

| | | | | |
|---|---|---|---|---|
| 2007/0230161 | A1* | 10/2007 | Longoria | F21S 8/00 |
| | | | | 362/101 |
| 2008/0223746 | A1* | 9/2008 | Van Rens | B65D 81/266 |
| | | | | 257/40 |
| 2009/0126481 | A1 | 5/2009 | Burris | |
| 2010/0106626 | A1* | 4/2010 | Ashrafzadeh | G06F 16/355 |
| | | | | 705/28 |
| 2010/0132474 | A1* | 6/2010 | Bleys | F17C 13/025 |
| | | | | 73/749 |
| 2015/0274360 | A1* | 10/2015 | Dye | B65D 19/44 |
| | | | | 206/597 |
| 2016/0109887 | A1* | 4/2016 | Palazzo | A47J 37/1266 |
| | | | | 137/386 |
| 2016/0151695 | A1* | 6/2016 | Pacheco Moreira Amorim | |
| | | | | E04H 4/0018 |
| | | | | 73/826 |
| 2017/0078769 | A1 | 3/2017 | Theberge | |
| 2018/0327243 | A1* | 11/2018 | Rider | B67D 1/0885 |
| 2019/0033119 | A1* | 1/2019 | Lease | B60K 15/03006 |
| 2019/0095663 | A1* | 3/2019 | Ayette | G06K 7/10366 |
| 2020/0271677 | A1* | 8/2020 | Kazama | G01N 35/00712 |

FOREIGN PATENT DOCUMENTS

| | | |
|---|---|---|
| DE | 20 2013 101 456 U1 | 6/2013 |
| KR | 102085721 B1 | 3/2020 |
| WO | WO200642119 A2 | 4/2006 |

OTHER PUBLICATIONS

International Search Report issued Jan. 12, 2021 in PCT/EP2020/060908 filed on Apr. 17, 2020, citing documents 1-3 & 15-17 therein, 2 pages.

European Office Action Dated Oct. 15, 2024 issued in corresponding European Patent Application No. 20720424.9 (8 pgs).

European Third Party Observation Notice dated Jan. 2, 2025, issued in European Patent Application EP20200720424 (3 pgs total).

\* cited by examiner

SELF-SUFFICIENT DISPLAY FOR FILL LEVEL AND LIMIT LEVEL MEASURING DEVICES

FIELD OF INVENTION

The invention relates to a sensor arrangement for fill level or limit level measurement of a product or pressure measurement in a vessel, a display device for displaying measurement data of a fill level or limit level measurement by means of a sensor arrangement, a control unit for configuring a autonomous (stand-alone) display device of a sensor arrangement for level or limit level measurement of a product or pressure measurement in a vessel, the use of an autonomous display device of a sensor arrangement for the level or limit level measurement of a filling material or the pressure measurement in a container, for the display of a status of the sensor or for the detection of the container, a method for the level or limit level measurement of a filling material or the pressure measurement in a container, a program element, a computer-readable medium and a control unit.

BACKGROUND OF THE INVENTION

In modern measurement technology, measurement sensors are used to detect a target object and/or to determine specific measurement data, for example for a level or limit level measurement. The measurement data can be displayed either by a wired display unit directly on site or via mobile end devices such as a smartphone or tablet.

Especially if the measuring sensors are installed in several process vessels distributed in a plant, it is not always easy for a user to keep track.

SUMMARY OF THE INVENTION

It is an object of the invention to provide an alternative measurement arrangement which facilitates the collection of important information by the user.

The object is solved by the features of the independent patent claims. Further embodiments of the invention result from the subclaims and the following description.

One aspect of the present disclosure relates to a sensor arrangement for fill level or limit level measurement of a product in a container. The sensor arrangement comprises a sensor configured to transmit and receive a measurement signal and to calculate measurement data, and an display device. The display device is spatially separated from the sensor and is configured to be mounted on or in the container. The display device comprises a receiving unit configured to wirelessly receive the measurement data of the sensor, and a signal indicator or signal display configured to display the measurement data of the sensor.

The sensor can, for example, be a radar sensor, in particular a non-contact measuring radar sensor for process automation in an industrial environment or for object detection.

The sensor can be arranged above the product, inside or outside the process vessel in such a way that the measuring signal emitted by the sensor can propagate in the direction of the product and be reflected by the surface of the product. If the sensor is arranged outside the container, the container can be made of a material that the measurement signal can penetrate. For example, the container is an IBC (intermediate bulk container) tank made of plastic.

Alternatively, the sensor can also be a radiometric sensor, which is arranged at the side of the container. Furthermore, the sensor can also be a pressure, temperature or flow sensor, for example.

The display device can be a stand-alone (autarkic, self-sufficient) display device. Alternatively, the display device can be connected to the sensor via a cable.

The display device or the self-sufficient display device, which is provided separately from the sensor, can be arranged flexibly, i.e. independently of the arrangement of the sensor. In particular, the self-sufficient display device can be mounted individually. For example, the self-sufficient display device can be arranged inside the container or on or in the filling material or the medium so that the self-sufficient display device can float on the filling material, for example, or can be sunk or immersed in the filling material. Alternatively, the self-sufficient display device can be arranged outside the container, on the side of the container or on an outer side of a frame to which the container is attached, so that the self-sufficient display device can be easily recognized or read from the outside.

The self-sufficient display device can be wirelessly connected to the sensor by means of the receiving unit and receive the measurement data from the sensor. Compared to a wired, possibly detachable indicator such as VEGAMET or VEGADIS, the sensor arrangement with the wireless self-sufficient display device can be used more flexibly and easily, for example, for monitoring or maintaining a process vessel in a plant.

According to an embodiment, the signal display of the display device of the sensor arrangement is set up to visually and/or acoustically display the measurement data of the sensor, and/or the status of the sensor.

By visually displaying by means of the signal display, the measurement data of the sensor, namely the level or the limit level of the product or the pressure inside the container, can be visually displayed. For example, the change of the measurement data of the sensor, namely the level, the limit level or the pressure can be displayed visually. In the case of acoustic display, the measurement data can be specifically signaled, for example, by emitting an acoustic signal, by emitting an acoustic warning signal when a certain fill level or a defined limit level is exceeded. Alternatively, the acoustic indication can be done by broadcast. The optical display can also be combined with the acoustic display.

In addition, the signal display of the sensor arrangement can be set up to identify the container associated with the sensor. For this purpose, the signal display of the display device or the stand-alone display device can be set up to visually detect the container, to identify the container or to recognize the location of the container, which is located, for example, in a system with several other containers and in which the sensor is arranged to detect the fill level or the limit level.

For example, the status of the sensor can be power on or power off, measurement, data processing, or a fault with the sensor.

Alternatively or additionally, the signal display can be set up to display individual or combined information, such as the filling material or the medium of the container assigned to the sensor or the oldest filling date, an order number, which are entered or stored on a cloud platform, for example.

According to another embodiment, the signal indicator is a luminous indicator.

Alternatively or additionally, a luminous display, which is set up to emit a light signal, can be provided in the display device. For this purpose, the light signal can correspond to the measurement data of the sensor.

According to a further embodiment, the luminous display is configurable by multiple colors to visually visualize the measurement data of the sensor, the status of the sensor, or switching states of the sensor.

The luminous display of the display device can be configurable in such a way that the luminous display of the display device can illuminate in several colors and, when illuminated or emitting a colored light signal, can specifically display or signal the measurement results of the sensor. For example, a certain color, e.g. red, can be characteristic for a predefined value range of the measurement data of the level measurement, indicate as a warning signal that the limit level has been exceeded during the limit level measurement or correspond to a certain switching state of the sensor, e.g. switching on or off.

Alternatively or additionally, the luminous display can be configured in such a way that the illumination can follow a predefined color gradient and thus indicate a specific measured value or a specific change in the measured value of the measurement data during the level or point level measurement.

The light indicator can also be configurable such that the light indicator can output a defined signal pattern.

The lighting can, for example, be permanent, cyclic with a predefined time interval or frequency, or following a specific prompt, such as a trigger signal, a pushbutton, or a defined fill level or limit level change.

The configurability of the luminous display in the multiple colors or according to the predefined color gradient or a defined signal pattern is significant and advantageous, especially when multiple containers or IBC tanks are arranged in a large plant or warehouse and the sensor arrangement includes multiple sensors, each individually installed in the multiple containers. For this purpose, the sensors may be of the same type. Or the sensors can be different sensors for level or limit level measurement, pressure measurement, or for some other measurement such as temperature or flow measurement.

For this purpose, a plurality of display devices, each associated with the plurality of sensors or the plurality of containers, may be provided and arranged individually.

For example, a clear assignment of the multiple containers in a system can be made possible or simplified by the fact that the multiple luminous indicators of the multiple display devices can be assigned by a special color or a characteristic signal pattern. Thus, for example, the containers that have the identical filling data or are filled with the same medium can be grouped and identified.

According to a further embodiment, the sensor arrangement further comprises a master display device, which is set up in the form of a master luminous display to display the measurement data from a plurality of sensors individually, in combination or collectively.

It can also be provided that the display device can be set up for combined or linked display of the measurement data of a level sensor and a limit level sensor. For example, the display device can be configured in such a way that in normal operation the fill level is continuously visualized via a color gradient and the limit level is only signaled by means of a flashing signal when the limit switch is switched on or the fill level exceeds a certain level.

Furthermore, a display device or a stand-alone display device, which can also serve as a common master display device used by several sensors, can be provided and set up to display the measurement data of the several sensors individually, in combination or collectively. Thus, simultaneous monitoring and visualization of the statuses of the multiple sensors, the fill or limit levels of the products in the multiple containers, and/or the fill data of the multiple containers can be enabled.

The indicator light may be configurable to prioritize the indication of a critical sensor status, such as the sensor malfunctioning, or a critical reading of the sensors measurement data.

The configuration of the luminous display can be carried out ex works or on site in the plant. This means that the assignment of the stand-alone display device to the sensor, the sensor arrangement and/or the container, the integration of the stand-alone display device in the cloud system and/or the connection to the other display devices in the networked plant for displaying the measurement data of the sensor and/or for addressing the container can be preconfigured ex works or set on site.

In addition, a communication device, for example for a commissioning system, or a monitoring device can be provided in the plant, which has a mobile eye-catching module and can be set up to record and evaluate the displayed signal of the luminous display of the sensor arrangement. The communication device may be of mobile design.

According to a further embodiment, the display device comprises an encapsulation adapted to encapsulate the display device in order to arrange the display device within the container or on or in the filling material.

The encapsulation may be designed to be watertight to enclose the indicating device. In particular, when the indicator is located on or in the filling material within the container, the encapsulation may serve to protect the indicator from the ingress of the water.

In the system with the multiple containers, the assignment of one of the multiple containers can be made even if the luminous indications of the indicating devices are arranged inside the container, on or in the filling material. The containers can transmit the colored light beams of the luminous indicators.

According to a further embodiment, the self-contained display device comprises a power supply comprising a rechargeable battery or a battery. Further, the power supply is arranged in the self-contained display device and is arranged to provide the power required to operate the self-contained display device.

The self-sufficient display device is a display device that can obtain the energy required to operate the display device not by wire from an external energy source, but from an internal energy source. The power supply may be arranged or incorporated as an internal component in the form of an accumulator or battery in the self-contained display device. The energy supply or battery may be charged inductively from the outside or wirelessly using energy harvesting. Alternatively, the energy supply can be charged by cable at a charging station and the stand-alone display unit can be used with the charged energy supply for level or limit level measurement.

According to a further embodiment, the stand-alone display device is arranged to be connected to the sensor via a direct radio link or a cloud system.

The sensors measurement data can be transmitted to the stand-alone display device via a wireless connection, such as LPWAN, Bluetooth, WLAN, LoraWan, NB-IOT.

Alternatively or additionally, the wireless connection or communication between the stand-alone display device and the sensor can take place via a cloud system, a central computer or a control level. The measurement data from the sensor may be transmitted from the sensor to the cloud system and then from the cloud system to the corresponding stand-alone display device. It may also be possible that the measurement data transmitted from the sensor can be further processed on the cloud system, that only a selected portion of the measurement data can be transmitted to the stand-alone display device for display.

Advantageously, the cloud system can enable the multiple sensors in a plant to be connected to the multiple stand-alone display devices and/or to a master display device. Thus, a networked plant can be formed with the multiple process vessels by means of the sensor arrangement. Combined with the configurability of the master display device and/or the plurality of autonomous display devices, the sensor arrangement can be advantageously deployed or used in the process industry, process automation and/or automation technology.

The term automation technology is understood to be a subfield of technology that includes all measures for the operation of machines and plants without the involvement of humans. One goal of the related process automation is to automate the interaction of individual components of a plant in the chemical, food, pharmaceutical, petroleum, paper, cement, shipping or mining industries. For this purpose, a variety of sensors can be used, which are especially adapted to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subfield of automation technology concerns logistics automation. With the help of distance and angle sensors, processes within a building or within an individual logistics facility are automated in the field of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and location of an object is required by the respective application side. Sensors based on optical measurement methods using lasers, LEDs, 2D cameras or 3D cameras that measure distances according to the time-of-flight (ToF) principle can be used for this purpose.

Another subfield of automation technology concerns factory/production automation. Application cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the participation of humans. The sensors used in this process and the specific requirements with regard to measuring accuracy when detecting the position and size of an object are comparable to those in the previous example of logistics automation. Therefore, sensors based on optical measurement methods are usually also used on a large scale in the field of factory automation.

In the field of logistics automation, as well as in the field of factory automation and safety technology, optical sensors have dominated up to now. These are fast (fast filling processes with more than 10 measurements/second) and inexpensive and can reliably determine the position and/or distance to an object due to the relatively easy focusable optical radiation, which is the basis of the measurement.

According to a further embodiment, the sensor arrangement comprises a control unit. The control unit is set up to connect to the display device by wire or wirelessly and to configure the display device to activate the display device cyclically at a predetermined time interval or by a trigger signal.

The control unit can be connected locally to the display device by wire or cable in order to configure the stand-alone display device. For this purpose, a corresponding connection can be provided in the display device to accommodate the control unit. Alternatively or additionally, the control unit may connect wirelessly to the display device by radio or via the cloud system. The control unit may be designed as a mobile operating device and may be integrated in the networked system or in the networked sensor arrangement.

The control unit can be set up to configure the display device of the sensor arrangement in such a way that the signal display can display the measurement data of the sensor, the status of the sensor visually and/or acoustically, and to signal the luminous display with a defined color, according to a specific signal pattern or color gradient, cyclically with a predetermined time interval and/or by a trigger signal, such as a broadcast command, in a targeted manner.

According to a further embodiment, the control unit is set up to send out a broadcast command. Alternatively or additionally, the display device or the master display device is set up to display the measurement data of the sensor or the multiple sensors simultaneously by the broadcast command.

In the system with the multiple containers and the sensor arrangement with the multiple display devices, the control unit can be designed as a master operating device and thus be connected to the multiple autonomous display devices.

Further, it may be possible for the control unit to receive a signal emitted by the cloud system as a trigger signal for activating one or more of the display devices. Alternatively, a master display device may be integrated into the control unit. Thus, receiving data from the cloud system and configuring the plurality of display devices can be uniformly controlled based on the received measurement data. Thus, the automation of the sensor arrangement in the process plant can be optimized.

Another aspect of the present disclosure relates to a display device for displaying measurement data of a level or limit level measurement or a pressure measurement by means of a sensor arrangement.

Another aspect of the present disclosure relates to a control unit for configuring a stand-alone display device of a sensor arrangement for level or point level measurement of a product or pressure measurement in a container.

Another aspect of the present disclosure relates to the use of a self-contained display device of a sensor arrangement for level or limit indication of a filling material or pressure indication in a container, for displaying a status of the sensor or for detecting the container.

Another aspect of the present disclosure relates to a method for level or point level measurement of a product or a pressure measurement in a vessel. The method comprises the following steps: Transmitting and receiving a measurement signal by means of a sensor and calculating measurement data, separately providing a display device for displaying the measurement data of the sensor, wirelessly receiving the measurement data from the sensor by means of a receiving unit of the display device, and displaying the measurement data of the sensor by means of a signal display of the display device.

According to a further embodiment, the method further comprises the steps of: wired or wirelessly connecting a control unit to the display device and configuring the display device and activating the display device cyclically with a predetermined time interval or by a trigger signal.

Another aspect of the invention relates to a program element which, when executed on a processor of a sensor arrangement, instructs the sensor arrangement to perform the following steps: Transmitting and receiving a measurement signal by means of a sensor and calculating measurement data, separately providing a display device for displaying the measurement data of the sensor, wirelessly receiving the measurement data of the sensor by means of a receiving unit of the display device, and displaying the measurement data of the sensor by means of a signal display of the display device.

Further, the program element may instruct the sensor arrangement to perform the further steps of: wired or wirelessly connecting a control unit to the display device and configuring the display device and activating the display device cyclically with a predetermined time interval or by a trigger signal.

Another aspect of the invention relates to a computer-readable medium on which a program element is stored.

Another aspect of the invention relates to a control unit on which a program element is stored.

In the following, further embodiments of the present disclosure are described with reference to the figures. Where identical reference signs are used in the following description of figures, these designate identical or similar elements. The representations in the figures are schematic and not to scale.

DETAILED DESCRIPTION OF EXAMPLES OF EXECUTION

Figure 1:
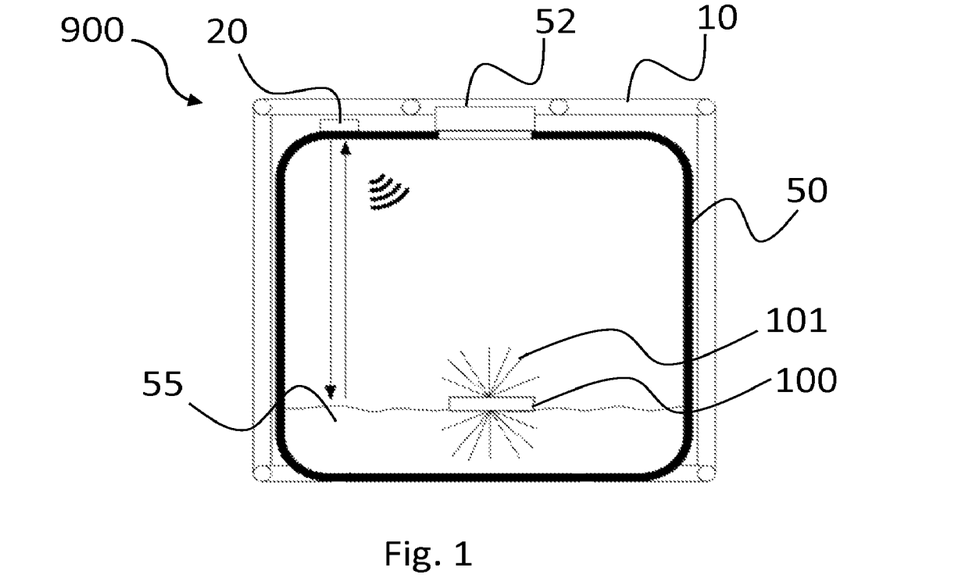
FIG. 1 shows a schematic diagram of a sensor arrangement for level or point level measurement according to an embodiment.

FIG. 1 shows a schematic diagram of a sensor arrangement 900 for level or point level measurement of a filling material (product) 55 in a container 50.

The sensor arrangement 900 includes a sensor 20 and a display device or self-contained display device 100 provided separately from the sensor 20 and wirelessly connected to the sensor 20.

In order to perform the fill level or limit level measurement, the sensor 20 is configured to transmit and receive a measurement signal and to calculate measurement data. The sensor 20 may be a radar sensor. The measurement signal emitted by the sensor 20 may propagate in the direction of the product 55 or the medium contained in an IBC container 50, for example, and may be reflected from the surface of the product 55. The IBC container 50 is arranged and secured in a steel frame 10 or strut and includes a lid 52 to form a closed interior for the contents 55. The IBC container 50 may be made of a plastic material to allow the wall of the container 50 to pass the measurement signal from the sensor 20.

Figure 2:
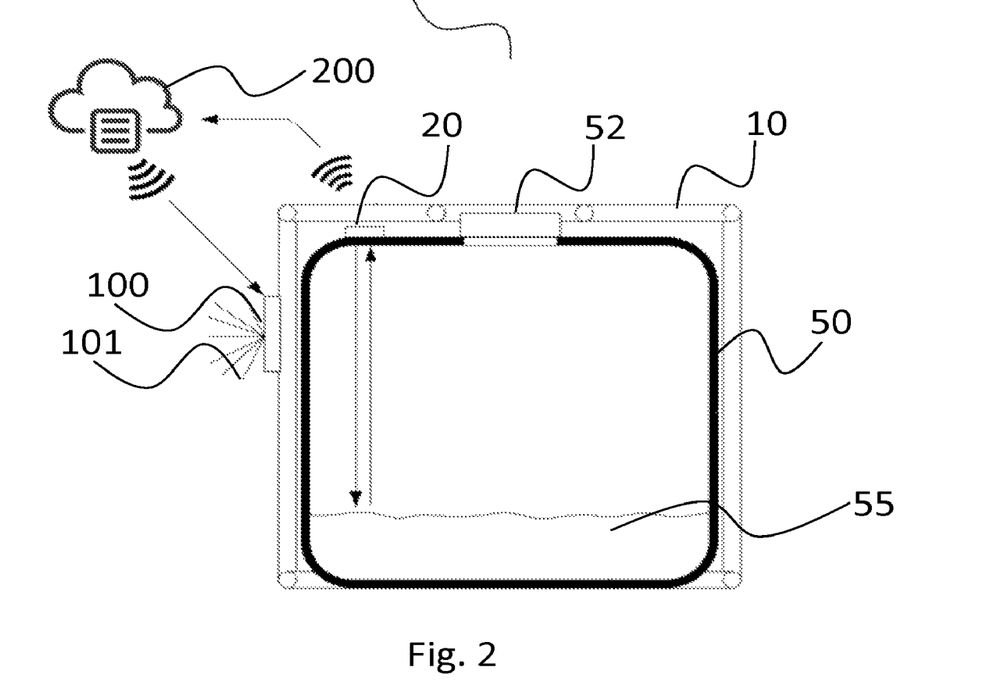
FIG. 2 shows a schematic diagram of a sensor arrangement for level or point level measurement according to a further embodiment.

The sensor 20 can communicate wirelessly with the self-sufficient display device 100, which can be provided as an independent component of the sensor arrangement 900 separate from the sensor 20. As a result, the self-sufficient display device 100 can be arranged independently of the arrangement of the sensor 20, flexibly, namely inside the container 50 as shown in FIG. 1 or outside the container 50 as shown in FIG. 2.

Figure 3:
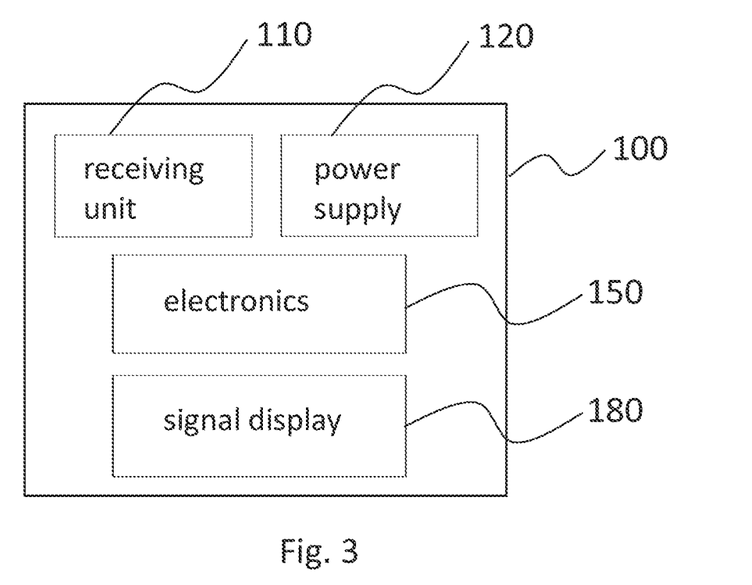
FIG. 3 shows a schematic representation of a stand-alone display device according to an embodiment.

As shown in FIG. 3, the self-sufficient display device 100 comprises a receiving unit 110 arranged to wirelessly receive measurement data from the sensor 20 and a signal display 180 arranged to display the measurement data from the sensor 20. The schematic diagram of the self-sufficient display device 100 shown in FIG. 3 is described in more detail below.

FIG. 1 further shows that the self-sufficient display device 100 can be arranged within the container 50 or in such a way that the self-sufficient display device 100 can be arranged on or in the filling material 55 or the medium. For example, the self-sufficient display device 100 can float on the filling material 55 or be submerged in the filling material. For this purpose, the self-sufficient display device 100 may comprise an encapsulation adapted to encapsulate the self-sufficient display device 100 to provide waterproof protection to the display device 100. The self-sufficient display device 100 arranged on or in the filling material 55 may comprise a luminous display and be arranged to emit and signal a light signal 101 in the form of a light beam or a light bundle out through the container 50 based on the measurement data received from the sensor 20.

Alternatively, the self-sufficient display device 100 may be arranged outside the container 55. Compared to FIG. 1, the self-sufficient display device 100 in FIG. 2 can be arranged on the side of the container 50 or on the outside of the frame 10. Thus, the sensor arrangement 900 can advantageously display the measurement data of the sensor 20 and to optimize the detectability or readability of the self-contained display device 100.

In FIG. 1, the measurement data can be transmitted from the sensor 20 to the self-sufficient display device 100 via a wireless connection, such as Bluetooth, WLAN, LoraWan, NB-IOT. Alternatively or additionally, as shown in FIG. 2, wireless communication between the self-sufficient display device 100 and the sensor 20 may be via a cloud system 200, a central computer, or a control plane.

FIG. 3 shows a schematic representation of the self-sufficient display device 100 of the sensor arrangement 900. In addition to the receiver unit 110 and the signal display 180, the self-sufficient display device 100 further comprises a power supply 120 and electronics 150.

The receiving unit 110 of the stand-alone display device 100 may be set up to wirelessly receive the measurement data from the sensor 20, for example by radio or via a cloud system 200. The receiving can be performed permanently, cyclically with a predetermined time interval or activating by a trigger signal.

The electronics 150 of the self-contained display device 100 may be in the form of a circuit board, for example, so that the receiver unit 110, the power supply 120, and the signal display 180 may be arranged on the electronics 150 and electrically connected via the electronics 150.

The power supply 120 is a built-in of the self-contained power supply unit disposed within the display device 100 to wirelessly provide the power required to operate the self-contained display device 100. The power supply 120 may comprise a battery or a rechargeable battery that may be externally charged, for example, inductively.

Alternatively or additionally, the battery may be charged using energy harvesting. It is also possible that the self-sufficient display device 100 can be charged by means of the energy supply 120 by cable at a charging station and can then be used to display the measurement data.

The signal display 180 of the stand-alone display device 100 may be configured to display the measurement data of the sensor 20. For this purpose, the signal display 180 can be set up for visually and/or acoustically displaying the measurement data of the sensor 20, and/or for visually and/or acoustically displaying the status of the sensor 20, and/or for identifying the container 50 assigned to the sensor 20 for identification.

Alternatively or additionally, the signal display 180 of the stand-alone display device 100 may be a luminous display. In this case, the luminous display can be designed to be configurable by several colors in order to visually visualize the measurement data of the sensor 20 or switching states of the sensor 20. For example, the luminous display 100 can be activated or switched on permanently, cyclically or by a trigger signal, such as a radio signal, a pushbutton, a defined fill level or limit level change.

Figure 4:
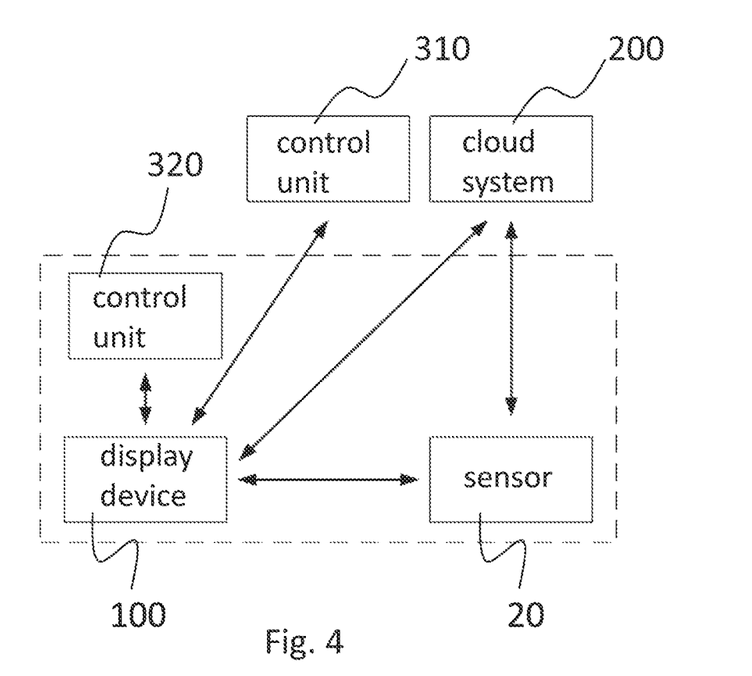
FIG. 4 shows a schematic representation of the communication paths within a sensor arrangement according to an embodiment.

FIG. 4 shows a schematic diagram of the communication paths within a sensor arrangement 900.

The sensor arrangement for level or point level measurement further comprises a control unit 310, 320 configured to connect wired or wirelessly to the self-sufficient display device 100 and thus configure the self-sufficient display device 100 to activate the self-sufficient display device 100 cyclically at a predetermined time interval or by a trigger signal. The control unit 320 may be locally connected to the self-sufficient display device 100. Alternatively, the control unit 310 may be wirelessly connected to the self-sufficient display device 100 by radio or via a cloud system 200.

In addition to the control unit 310, 320, the self-contained display device 100 may wirelessly connect to the sensor 20 or a cloud system 200 that is also wirelessly connected to the sensor 20 and may receive measurement data from the sensor 20 via radio. Thus, the self-sufficient display device 100, the sensor 20 and the control unit 310, 320 of the sensor arrangement 900 can be provided separately from each other and arranged separately. This can advantageously increase the flexible usability of the sensor arrangement in a plant with the multiple containers to be monitored and the mobility of the sensor arrangement.

Figure 5:
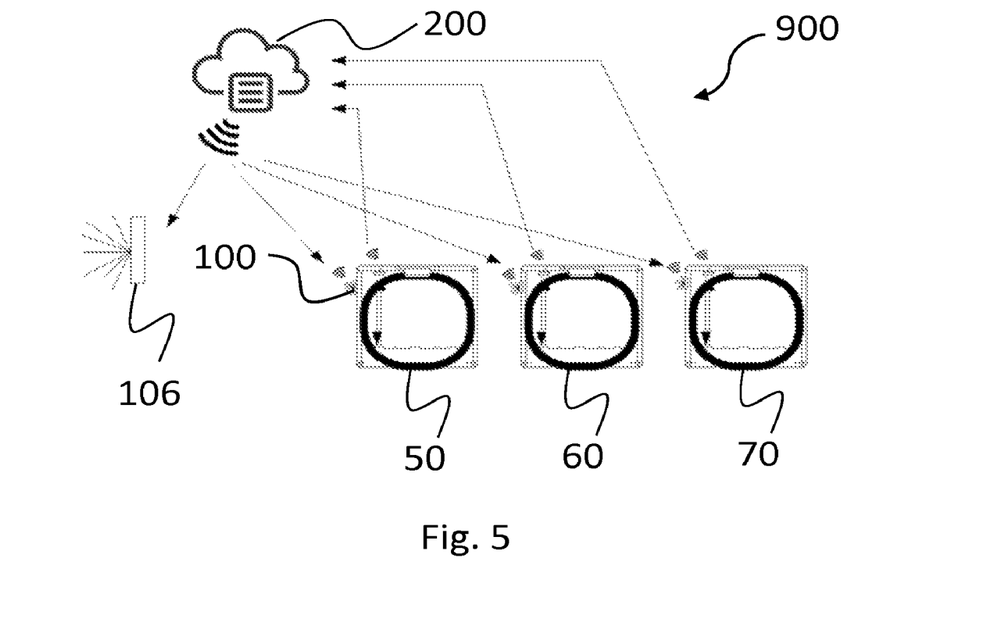
FIG. 5 shows a schematic diagram of the arrangement of a stand-alone display device in a system according to an embodiment.

For example, FIG. 5 shows a schematic diagram of the arrangement of a stand-alone master display device 106 in a plant.

In the system, the sensor arrangement 900 in FIG. 5 includes a plurality of sensors each disposed in one of the plurality of containers 50, 60, 70, and a plurality of self-contained display devices 100 each associated with one of the plurality of sensors and/or one of the plurality of containers 50, 60, 70. The sensors may be similar or different sensors for level or limit level measurement or, for example, for pressure, temperature, or flow measurement. The plurality of sensors and the plurality of autonomous display devices may be wirelessly connected via a cloud system or an IOT cloud platform, and a networked system may be formed thereby. Thus, the sensor arrangement may enable the plurality of sensors to transmit the determined or calculated measurement data to the cloud system 200, and the plurality of autonomous display devices associated with the sensors may receive the measurement data from the cloud system 200 and display the measurement data of the plurality of sensors individually, in association, or collectively.

In addition, the sensor arrangement may further comprise another stand-alone display device, which may be configured as a master display device 106 to display the measurement data from the plurality of sensors via the cloud system 200. In FIG. 5, the master display device 106 is provided outside the plurality of containers 50, 60, 70. Since the measurement data of the plurality of sensors is accessible in the cloud system 200, the master display device 106 may be configured to display the measurement data or sensor status of a targeted sensor or in a composite of the plurality of sensors, and to monitor the level or limit level in a targeted container or in the plurality of containers.

Figure 6:
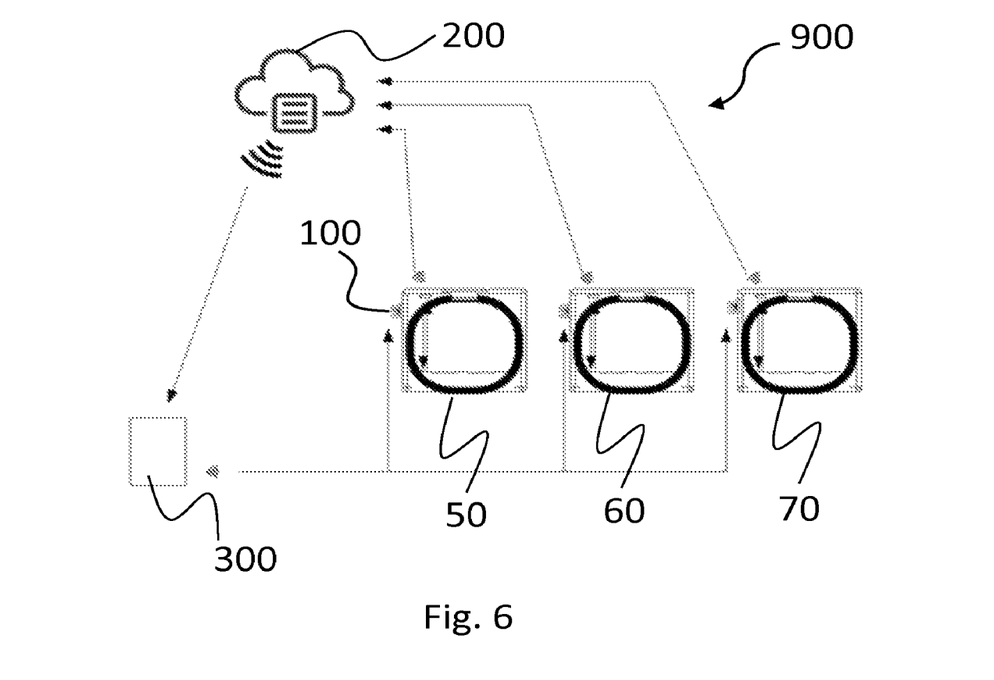
FIG. 6 shows a schematic diagram of the arrangement of a control unit in a system according to an embodiment.

FIG. 6 shows a schematic diagram of the arrangement of a control unit 300 in a system according to one embodiment.

Similar to FIG. 5, the sensor arrangement 900 in the system includes a plurality of sensors each disposed in one of the plurality of containers 50, 60, 70, and a plurality of self-sufficient display devices 100 each associated with one of the plurality of sensors and/or one of the plurality of containers 50, 60, 70. The plurality of sensors and the plurality of self-sufficient display devices may be wirelessly connected via a cloud system. Thus, it is possible for the plurality of sensors to transmit the determined or calculated measurement data to the cloud system 200, and for the plurality of self-sufficient display devices associated with the sensors to receive the measurement data from the cloud system 200 and individually display the measurement data.

The control unit 300 in FIG. 6 is configured to connect wired or wirelessly to the plurality of self-contained display devices and to configure the plurality of self-contained display devices 100 to activate the self-contained display device cyclically at a predetermined time interval or by a trigger signal. In other words, the control unit 300 may be in the form of a master operating device. The connection between the control unit 300 and the plurality of self-sufficient display devices respectively associated with the plurality of containers 50, 60, 70 may be by cable or wirelessly by radio.

Further, the control unit 300 may be configured to be wirelessly connected to the cloud system 200 and to receive a signal emitted by the cloud system 200 as a trigger signal for activating a display device or the plurality of stand-alone display devices. Alternatively, a master display device 106, as shown in FIG. 3, may be integrated into the control unit 300. Thus, receiving data from the cloud system 200 and configuring the plurality of self-sufficient display devices can be uniformly controlled based on the received measurement data.

Figure 7:
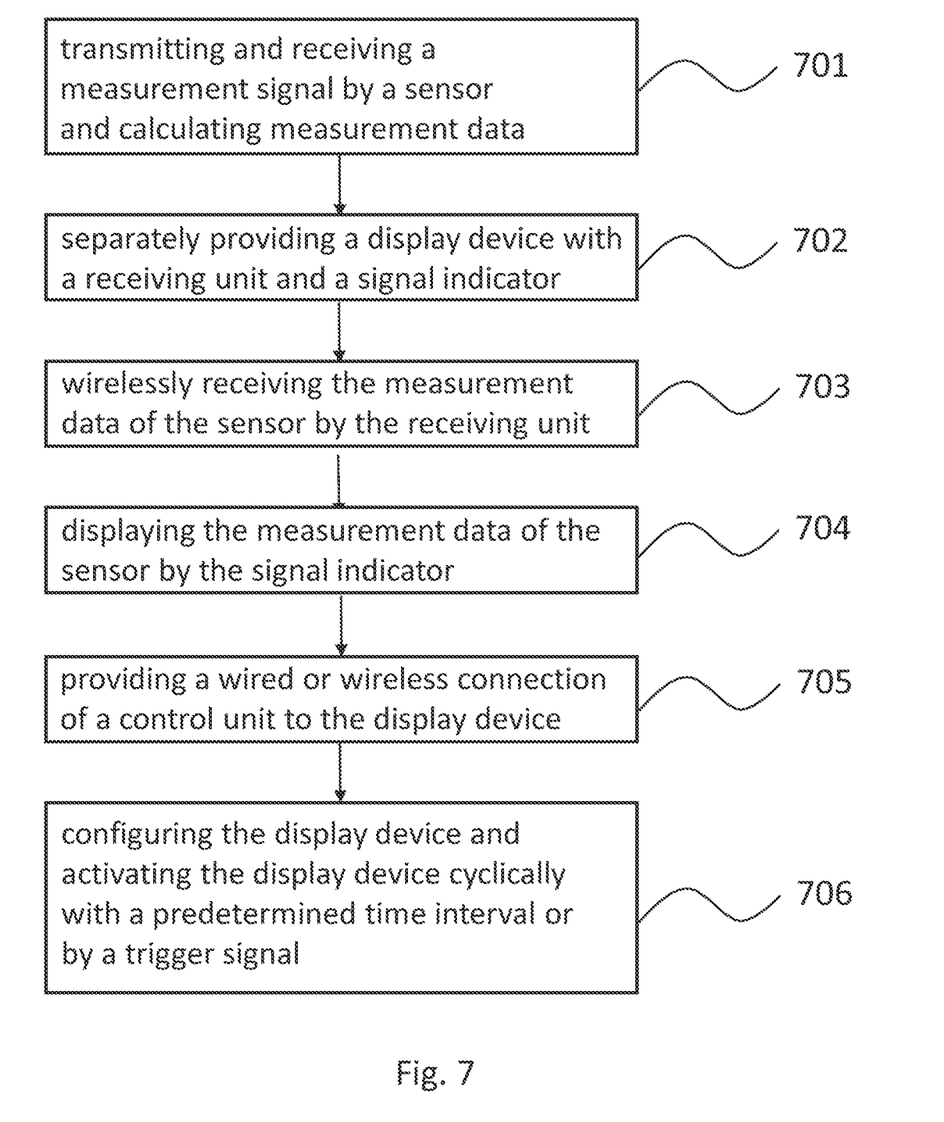
FIG. 7 shows a flow diagram of a method for level or point level measurement of a product according to an embodiment.

FIG. 7 shows a flowchart of a method for level or limit level measurement of a product 55 in a container 50. In the first step 701, a measurement signal is transmitted and received by means of a sensor 20 of a sensor arrangement 900, and the measurement data is calculated based on the measurement signal. In step 702, a self-sufficient display device 100 having a receiving unit 110 and a signal display 180 is separately provided to the sensor arrangement 900 for displaying the measurement data of the sensor. Thus, the self-sufficient display device 100 can be flexibly arranged inside or outside the container independently of the arrangement of the sensor 20. In step 703, the measurement data from the sensor 20 is wirelessly received by means of the receiving unit 110 of the self-sufficient display device 100. In this regard, the receiving may be performed via a wireless connection or a cloud system 200. In step 704, the measurement data from the sensor 20 is displayed by means of the signal display 180 of the self-contained display device 100.

Further, in step 705, a control unit 300, 310, 320 of the sensor arrangement 900 is connected to the self-sufficient display device 100 in a wired or wireless manner. Subsequently, in step 706, the self-sufficient display device 100 is configured by the control unit 300, 310, 320 and activated cyclically with a predetermined time interval or a trigger signal.

Supplementally, it should be noted that "comprising" or "having" does not exclude other elements, and "a" or "an" does not exclude a plurality. It should further be noted that features described with reference to any of the above embodiments may also be used in combination with other features of other embodiments described above. Reference signs in the claims are not to be regarded as a limitation.

The invention claimed is:

1. A sensor arrangement for level measurement or limit the level measurement of a filling material or pressure measurement in a container in a networked plant, the sensor arrangement comprising:
   a sensor configure to transmit and receive a measurement signal and to calculate measurement data; and
   a display device, which is provided separately from the sensor, and comprises
      a receiving unit configured to wirelessly receive the measurement data of the sensor, and
      a signal indicator configured to display the measurement data of the sensor and to identify a the container assigned to the sensor for identification,
   wherein the signal indicator is a luminous display,
   wherein the luminous display is configured to assign the display device to the sensor, the sensor arrangement, and/or the container in the networked plant, and
   wherein the display device is flexibly, independently of the arrangement of the sensor, arranged inside or outside the container.

2. The sensor arrangement according to claim 1, wherein the display device is a stand-alone display device.

3. The sensor arrangement according to claim 1,
   wherein the signal indicator is further configured to visually and/or acoustically display the measurement data of the sensor and/or a status of the sensor, and/or
   wherein the signal indicator is further configured to identify the container associated with the sensor.

4. The sensor arrangement according to claim 1, wherein the luminous display is configurable by a plurality of colors to optically visualize the measurement data of the sensor, a status of the sensor, or switching states of the sensor.

5. The sensor arrangement according to claim 1, further comprising a master display device configured as a master luminous display to display the measurement data from a plurality of sensors individually, in combination, or collectively.

6. The sensor arrangement according to claim 5, further comprising a control unit configured to connect wired or wirelessly to the display device and to configure the display device to activate the display device cyclically at a predetermined time interval or by a trigger signal.

7. The sensor arrangement according to claim 6,
   wherein the control unit is further configured to send out a broadcast command, and/or
   wherein the display device and/or the master display device is further configured to display the measurement data of one or more sensors of the plurality of sensors simultaneously by the broadcast command.

8. The sensor arrangement according to claim 1, wherein the display device further comprises an encapsulation configured to encapsulate the display device to dispose the display device within the container or on or in the filling material.

9. The sensor arrangement according to claim 1, wherein the display device further comprises a power supply comprising a rechargeable battery or a battery arranged in the display device and configured to provide power required to operate the display device.

10. The sensor arrangement according to claim 1, wherein the display device is further configured to be connected to the sensor via a direct radio link or a cloud system.

11. The sensor arrangement according to claim 1, wherein the display device is arranged inside the container or on or in the filling material, in order to float on the filling material or be immersed in the filling material and to visually and/or acoustically display the measurement data of the sensor and/or a status of the sensor via the luminous display.

12. A method for fill level measurement or limit the level measurement of a filling material or pressure measurement in a container in a networked plant, the method comprising:
   transmitting and receiving a measurement signal by a sensor and calculating measurement data;
   separately providing a display device configured to display the measurement data of the sensor by flexibly, independently of an a sensor arrangement, arranging the display device inside or outside the container;
   wirelessly receiving the measurement data of the sensor by a receiving unit of the display device; and
   displaying the measurement data of the sensor and identifying the container assigned to the sensor for identification, by a signal indicator of the display device,
   wherein the signal indicator is a luminous display,
   wherein the luminous display is configured to assign the display device to the sensor, the sensor arrangement and/or the container in the networked plant.

13. The method according to claim 12, further comprising:
   providing a wired or wireless connection of a control unit to the display device; and
   configuring the display device and activating the display device cyclically with a predetermined time interval or by a trigger signal.

14. A nontransitory computer-readable storage medium comprising computer program instructions stored therein, which when executed on a processor, instructs a sensor arrangement to perform steps of a method for fill level measurement or limit the level measurement of a filling material or pressure measurement in a container in a networked plant, the method comprising:
   transmitting and receiving a measurement signal by a sensor and calculating measurement data;
   separately providing a display device configured to display the measurement data of the sensor by flexibly, independently of the sensor arrangement, arranging the display device inside or outside the container;
   wirelessly receiving the measurement data of the sensor by a receiving unit of the display device; and displaying the measurement data of the sensor and identifying the container assigned to the sensor for identification, by a signal indicator of the display device,
wherein the signal indicator is a luminous display,
wherein the luminous display is configured to assign the display device to the sensor, a sensor arrangement and/or the container in the networked plant.

15. The nontransitory computer-readable storage medium according to claim 14, further comprising a control unit on which the computer program instructions are stored.

* * * * *